Jan. 12, 1960  F. C. ROBINSON  2,920,834
METHOD OF WINDING ELECTRICAL CAPACITORS
Filed April 30, 1956
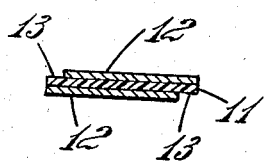
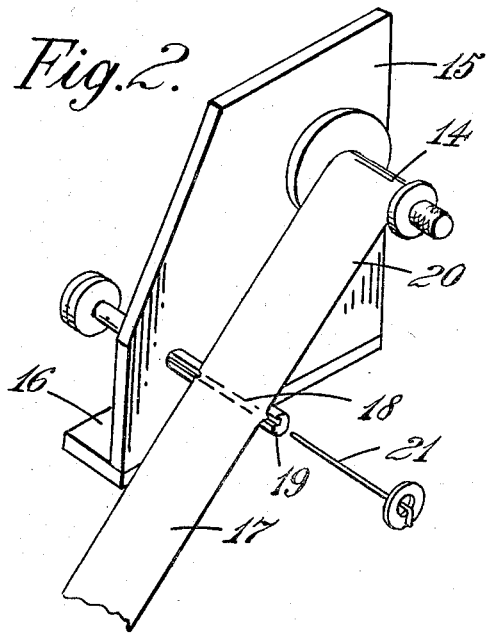
INVENTOR
FREDERICK C. ROBINSON
By Watson, Cole, Grindle & Watson
ATTORNEYS

United States Patent Office 2,920,834
Patented Jan. 12, 1960

2,920,834

METHOD OF WINDING ELECTRICAL CAPACITORS

Frederick Chetham Robinson, London, England, assignor to A. H. Hunt (Capacitors) Limited, London, England, a British company Application April 30, 1956, Serial No. 581,613

Claims priority, application Great Britain May 3, 1955

1 Claim. (Cl. 242—56.1)

This invention relates to the manufacture of electrical rolled capacitors of the kind wound from metallised dielectric strip material. An object is to provide an improved method of making capacitors from flexible dielectric strip metallised on both sides.

According to the method of the present invention, a roll of flexible strip dielectric metallised on both faces is taken and a length pulled off substantially equal to half the winding length of the desired capacitor, the inner end of said length where it is still attached to the roll is applied to a winding spindle, and winding is commenced whereby a double thickness of the strip is wound, both the drawn-off length and another similar length from the roll being wound on to the spindle simultaneously.

This provides a simple way of winding capacitor units from a single supply roll of dielectric.

A method of carrying the invention into effect will now be described by way of example, reference being had to the accompanying drawings in which:

Figure 1 shows the metallised dielectric strip employed in cross-section, and

Figure 2 is a perspective view of the machine for winding the capacitors.

Flexible dielectric strip 11 (Figure 1) either paper or synthetic plastic material, is metallised on both faces as at 12 and is provided with unmetallised edge margins 13, preferably by de-metallising in accordance with the electrical de-metallising technique described in my United States Patent No. 2,435,441. The unmetallised margins may however, be obtained in another fashion as by masking the edges of the strip during metallising. Both edges of each face may be de-metallised, but preferably only one edge of each face is de-metallised as shown, that is to say, one edge on one face and the opposite edge of the other face, so that after forming into a rolled capacitor unit, terminal connections may be made to the ends of the roll in the well known manner.

To wind a capacitor unit from a supply roll of this dielectric strip, the supply roll 14 is mounted on an upstanding plate 15 of a winding frame 16 (Figure 2). A length 17 of the strip is pulled off (but not detached from) the roll 14 equal to half the winding length of the required capacitor unit. A fold made in the strip at a position 18 at the inner end of the length 17, is then inserted into a grooved winding spindle 19 and trapped by insertion of a removable holder rod 21. Rotation of the spindle 19 will then wind up the pulled off length of material 17, and will also draw off and wind on simultaneously another equal length 20 from the main roll 14. The effect achieved is therefore equivalent to that of winding on two separate contiguous lengths of the metallised dielectric.

An advantage of producing a capacitor unit by this method is that the winding machine required is very simple, needing only one dielectric foil carrier and supply spindle. Furthermore, the operation of starting the wind is greatly simplified, since no precautions against short circuits have to be taken, as is the case when winding from two separate rolls of material when cut ends have to be dealt with at the beginning of each wind.

At the end of the wind, short-circuiting between the metallisation on opposite sides of the strip is prevented by providing demetallised margins across the cut ends, either by removal of metallisation by electrical burn-off or in any other convenient manner.

I claim:

A method of making wound electrical capacitors from a single supply roll only of flexible dielectric strip bearing adherent layers of metallization on both faces, comprising the steps of pulling out of the roll a length substantially equal to half the winding length of the desired capacitor, attaching said length to a winding spindle at a point on said length adjacent said roll, then rotating the spindle to wind up both the length already pulled out and a second similar length which is pulled out of the roll as the winding proceeds, and severing the end of the second length from the roll at the completion of winding.

References Cited in the file of this patent

UNITED STATES PATENTS

| | | |
|---|---|---|
| 618,287 | Patterson | Jan. 24, 1899 |
| 1,866,585 | Tenney | July 12, 1932 |
| 1,909,079 | Steerup | May 16, 1933 |
| 1,924,711 | Edenburg | Aug. 29, 1933 |
| 2,045,966 | Ruehmann | June 30, 1936 |
| 2,235,489 | Rath | Mar. 18, 1941 |

FOREIGN PATENTS

| | | |
|---|---|---|
| 506,457 | Canada | Oct. 12, 1954 |